(12) United States Patent
Canora

(10) Patent No.: US 8,231,047 B2
(45) Date of Patent: Jul. 31, 2012

(54) SYSTEM AND METHOD FOR DISTRIBUTED AND REAL-TIME COLLECTION OF CUSTOMER SATISFACTION FEEDBACK

(75) Inventor: David Canora, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 393 days.

(21) Appl. No.: 12/228,585

(22) Filed: Aug. 13, 2008

(65) Prior Publication Data

US 2010/0038416 A1 Feb. 18, 2010

(51) Int. Cl.
*G06F 17/00* (2006.01)
(52) U.S. Cl. .......................................... 235/375; 235/436
(58) Field of Classification Search ................... 705/7.19
See application file for complete search history.

(56) References Cited

U.S. PATENT DOCUMENTS

| | | | | |
|---|---|---|---|---|
| 6,679,421 B2* | 1/2004 | Shin et al. | | 235/375 |
| 2001/0052122 A1* | 12/2001 | Nanos et al. | | 725/9 |
| 2002/0044687 A1* | 4/2002 | Federman | | 382/187 |
| 2005/0149382 A1* | 7/2005 | Fenner et al. | | 705/10 |
| 2006/0161787 A1* | 7/2006 | Kikuchi | | 713/186 |
| 2006/0195354 A1* | 8/2006 | Borovoy et al. | | 705/11 |
| 2008/0097769 A1* | 4/2008 | Galvin et al. | | 705/1 |
| 2008/0277466 A1* | 11/2008 | Dohm et al. | | 235/382 |
| 2009/0287544 A1* | 11/2009 | Neubardt | | 705/10 |

* cited by examiner

*Primary Examiner* — Thien M. Le
*Assistant Examiner* — Sonji Johnson
(74) *Attorney, Agent, or Firm* — Farjami & Farjami LLP

(57) ABSTRACT

There is provided a device and a method for collecting information from a customer concerning a point of interest. The device comprises a memory including a unique location identifier associated with a point of interest and a processor, the processor configured to store in the memory a received unique customer identifier and received information concerning the point of interest from a customer. The device can transmit this stored data to a center via a network, where the center can aggregate the data. There is also provided a system for distributed collection of information from customers concerning points of interest, utilizing a plurality of devices and a center for aggregating data. The center can apply data analysis and mining to the aggregate data, allowing rapid and real-time reaction to feedback from customers, efficient turnaround for resolving customer service issues, and enabling efficient research of customer preferences and trends.

20 Claims, 4 Drawing Sheets

Restroom #270c Monitoring Status
Current Time: 5:41pm

| Customer ID | Rating | Time |
|---|---|---|
| 280a | 5 | 5:00pm |
| 280b | 5 | 5:05pm |
| 280c | 1 | 5:32pm |
| 280d | 1 | 5:40pm |

Warning!
Average rating has fallen below threshold.

Click to dispatch custodial staff to investigate.

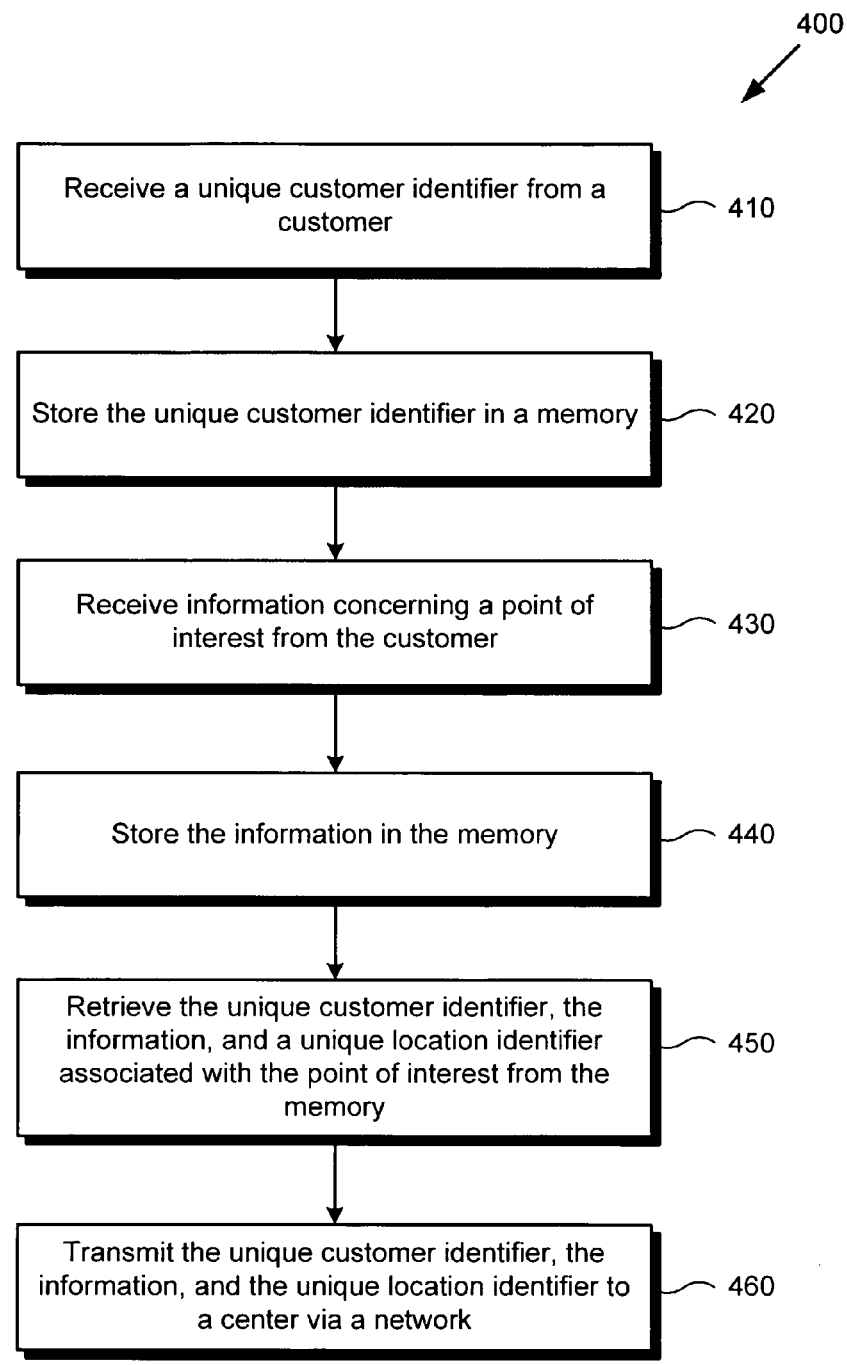

SYSTEM AND METHOD FOR DISTRIBUTED AND REAL-TIME COLLECTION OF CUSTOMER SATISFACTION FEEDBACK

BACKGROUND OF THE INVENTION

1. Field of the Invention

The present invention relates generally to electronic circuits and systems. More particularly, the present invention relates to communications systems for transmission of digital data.

2. Background Art

Businesses tend to collect customer satisfaction feedback in a haphazard manner where only a small unrepresentative fraction of the customer base actually ends up providing feedback. Traditional feedback collection methods such as pen and paper surveys, mail or Internet forms, and interviews with service staff often inconvenience busy customers with little time to spare, erecting a high barrier to voluntary participation. Although businesses often attach incentives for providing feedback, such as chances to win a prize or discounts, these incentives are often insufficient to persuade an average customer to spend the time required to provide meaningful feedback. Additionally, because particularly angry or happy customers might be highly motivated to provide feedback, responses might skew towards the extremes. Meanwhile, the vast majority of customers remain quiet and indifferent, deterred by the high effort barrier.

Running such traditional feedback programs can also become prohibitively expensive for businesses, particularly where there are multiple aspects of the business needing feedback. The labor costs of maintaining the feedback programs may outstrip any benefits the feedback might provide. Often, the received feedback needs to be manually parsed, for example by counting and tallying surveys. Additional customer service staff may also need to be hired to operate the feedback programs. These labor requirements consume resources that may be better directed towards other aspects of the business.

As a result of the time and effort expenditures required for providing feedback, many customer responses, if provided at all, will be delayed until long after the customer interacts with the subject matter of the feedback. Parsing the feedback delays the results even further. Intervening events, the passage of time, and fleeting whimsy may cloud customer recollection, causing misattributed and inaccurate feedback. Additionally, the belated feedback might be provided past the time window when ameliorating measures are available and feasible to implement.

Accordingly, there is a need to overcome the drawbacks and deficiencies in the art by providing a way to collect customer satisfaction feedback quickly, unobtrusively, and without requiring undue effort and inconvenience from customers.

SUMMARY OF THE INVENTION

There are provided systems and methods for distributed and real-time collection of customer satisfaction feedback, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a feedback device can provide collection of information concerning a point of interest from a customer.

DETAILED DESCRIPTION OF THE INVENTION

The present application is directed to a system and method for distributed and real-time collection of customer satisfaction feedback. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
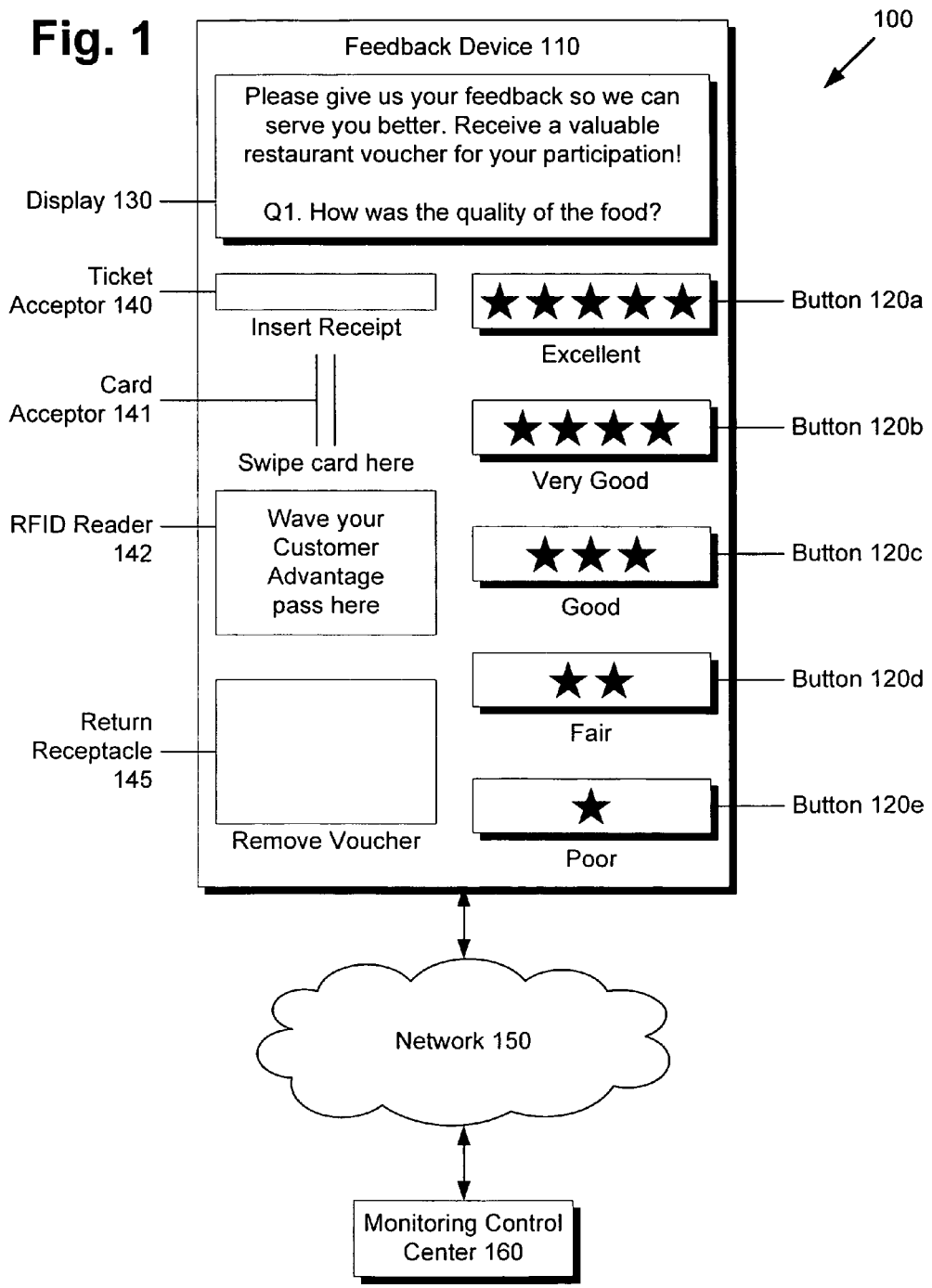
FIG. 1 presents a device for collecting information from a customer concerning a point of interest, according to one embodiment of the present invention.

FIG. 1 presents a device for collecting information from a customer concerning a point of interest, according to one embodiment of the present invention. Feedback device environment 100 includes feedback device 110, network 150, and monitoring control center 160. Feedback device 110 includes buttons 120a, 120b, 120c, 120d, and 130e, display 130, ticket acceptor 140, card acceptor 141, RFID reader 142, and return receptacle 145.

Feedback device 110 is provided to collect customer satisfaction feedback regarding some nearby point of interest. To support the operation of feedback device 110, a processor (not shown) for logic and execution, and a memory (not shown) for storage can be embedded. The memory may include a unique location identifier that is associated with the nearby point of interest, so that responses sent from feedback device 110 can be associated with the correct point of interest. For FIG. 1, a restaurant can be the point of interest, as shown by the prompt on display 130. The embodiment of feedback device 110 shown in FIG. 1 might be configured as a stationary kiosk placed near the restaurant exit, so that patrons who have finished their meal can conveniently rate their experience.

Numerous mechanisms for identifying the particular customer can be provided by feedback device 110, such as ticket acceptor 140, card acceptor 141, and RFID reader 142. Ticket acceptor 140 might scan a barcode printed on the customer's dinner receipt, for example. Card acceptor 141 might read a magnetic stripe on a membership card, credit card, or other identification card associated with the customer, reading an identifier after a customer swipes the card across a magnetic reader. RFID reader 142 might read an embedded RFID tag identifying the customer. In the embodiment of FIG. 1, this RFID tag might be embedded into a rewards program card called Customer Advantage, where patrons can accrue points to their account for providing feedback. A customer then merely waves his card or wallet near the RFID reader, which can then read the embedded RFID tag.

Thus, a unique customer identifier can be associated with the customer providing the feedback, which enables some advanced functionality at the monitoring and analysis end represented by monitoring control center 160. As a result, feedback device 110 can associate multiple feedback instances with the same customer, which can be used for data mining and analysis.

In one embodiment, for example, registration in the Customer Advantage program mentioned above might not require any personal details from the customer at all, thus rendering the identities of the participating customers anonymous. In this case, the data embedded in the RFID tag might have some arbitrary identifying number and perhaps store an earned points value, but it will not contain nor externally reference personally identifiable information such as name, address, and phone number, for example. Alternatively, an opt-in program might be implemented, where customers agree to participate in a program collecting personally identifiable information in exchange for desirable benefits such as discounts. Both options might be provided to tailor to different personal standards of privacy, as some customers might value discounts more heavily than their privacy, and vice versa.

Once the unique customer identifier associated with the customer is read or received using the appropriate reading device, feedback device 110 may prompt the customer on display 130 with one or more questions regarding the restaurant experience. Display 130 may also encourage customers to complete the feedback session by promising a valuable restaurant voucher. As FIG. 1 illustrates, the first question asks the customer to rate the quality of the food just consumed. Feedback device 110 provides five buttons, buttons 120a, 120b, 120c, 120d, and 120e, for answering the questions. Each of these buttons is labeled with a star rating and a caption. These buttons might be preset to a simple one to five star rating system as shown in FIG. 1, which restricts the presentable questions to questions answerable with such a rating system.

Alternatively, the buttons and captions might dynamically change depending on the question, allowing for a wider range of questions that may be difficult to answer with a simple numerical scale. Configurable displays behind the buttons or a touch sensitive screen or might be used to change the answer choices presented to the customer. Each question might then be structured as a multiple-choice question, accompanied with several predetermined answer choices presented in a list. For example, a question may ask the customer what area needs the most improvement, and buttons 120a through 120e might display the choices "Lighting," "Noise," "Punctuality," "Beverage refills," and "Food temperature." This question does not neatly translate into a numeric scale, but can still provide valuable feedback without burdening the customer with five separate questions regarding each area of interest.

Even if the question can be expressed using a numeric scale, a descriptive answer choice may nevertheless facilitate faster feedback turnaround. For example, a restaurant feedback question might ask the customer's perception on the doneness of his steak, and buttons 120a through 120e might present the answer choices "rare," "medium-rare," "medium," "medium-well," and "well-done." Since steak eaters are generally familiar with these terms, an answer may be forthcoming much quicker than a question asking the customer to rate the doneness of a steak on a scale from one through five. Behind the scenes at the data processing stage, these descriptive names can be translated into numerical representations for easier data manipulation. Coupled with the order information on the customer's receipt indicating the actual ordered doneness, this feedback could be used to fine-tune the preparation of steaks to more closely match customer expectations and preferences, enhancing customer satisfaction.

In alternative embodiments, feedback device 110 may not directly provide an input interface for customers, instead relying on an input device held by the customer. Such input device may be a mobile phone, a portable videogame device, a wristband with radio frequency identification (RFID) capabilities, or any other device capable of accepting customer input and communicating with other devices. For example, consider that buttons 120a through 120e are removed from feedback device 110. Instead, feedback device 110 might broadcast a feedback collection program to input devices such as the ones enumerated above. Alternatively, customers might be instructed to contact a specific number or address, or scan a barcode that points to a feedback collection interface. In yet another embodiment, the input device might communicate directly with feedback device 110, acting as a direct substitute for the missing buttons.

For example, the wristband mentioned above might include buttons that transmit a value by radio frequency to feedback device 110. These buttons might correspond to the missing buttons 120a through 120e. After a customer identifies himself at feedback device 110, he can use the buttons on the wristband to provide feedback. By moving some of the input collection burden to external devices, multiple customers can submit feedback concurrently at a given feedback device, and deployment costs might be significantly reduced, especially in a plan utilizing many feedback devices.

Alternatively, an input arrangement utilizing a plurality of detection means may enable customer identification and feedback reception at the same time, resulting in faster turnaround and less inconvenience for the customer, particularly if only one feedback response is desired from the customer. This might be accomplished by substituting separate individual RFID readers for each button in the example shown by FIG. 1, with each RFID reader representing a particular one to five star rating. Then, a customer may merely bring an RFID tag within range of a particular RFID reader to provide a unique customer identifier retrieved from the RFID tag and a feedback rating based on the particular RFID reader chosen. This RFID tag might be embedded within a wristband, a card, a ticket, or some other other methods of identification may be utilized, such as barcode scan or magnetic stripe. Thus, for example, five individual ticket acceptors or five individual card acceptors could be installed in lieu of the five buttons.

After the customer chooses an answer to the first question regarding the general quality of the food, feedback device 110 might ask a few additional questions, possibly asking questions specific to the customer, such as opinions regarding the particular menu items ordered, or the courteousness of the assigned waiter. Alternatively, the line of questioning might be kept intentionally brief to avoid customer frustration over having to complete a long and involved questionnaire. Depending on the input capabilities of feedback device 110, an opportunity for more detailed feedback beyond predetermined choices might be offered, such as a handwritten, typed, audio or video comments.

Once feedback device 110 confirms satisfactory completion of the presented questions, it may proceed to provide the promised voucher via return receptacle 145, or otherwise credit the account associated with the unique customer identifier: for example, by adding additional points to the customer's Customer Advantage card. At this point the collection of feedback is completed, and all that remains is to transfer the gathered feedback data, the customer's unique customer identifier, and the unique location identifier to monitoring control center 160 over network 150 for further analysis. Network 150 might be implemented using a wireless network, and monitoring control center 160 shall be discussed in further detail below. In one embodiment, the gathered feedback data may be transmitted to monitoring control center 160 over network 150 without the customer's unique customer identifier and/or the unique location identifier.

Figure 2:
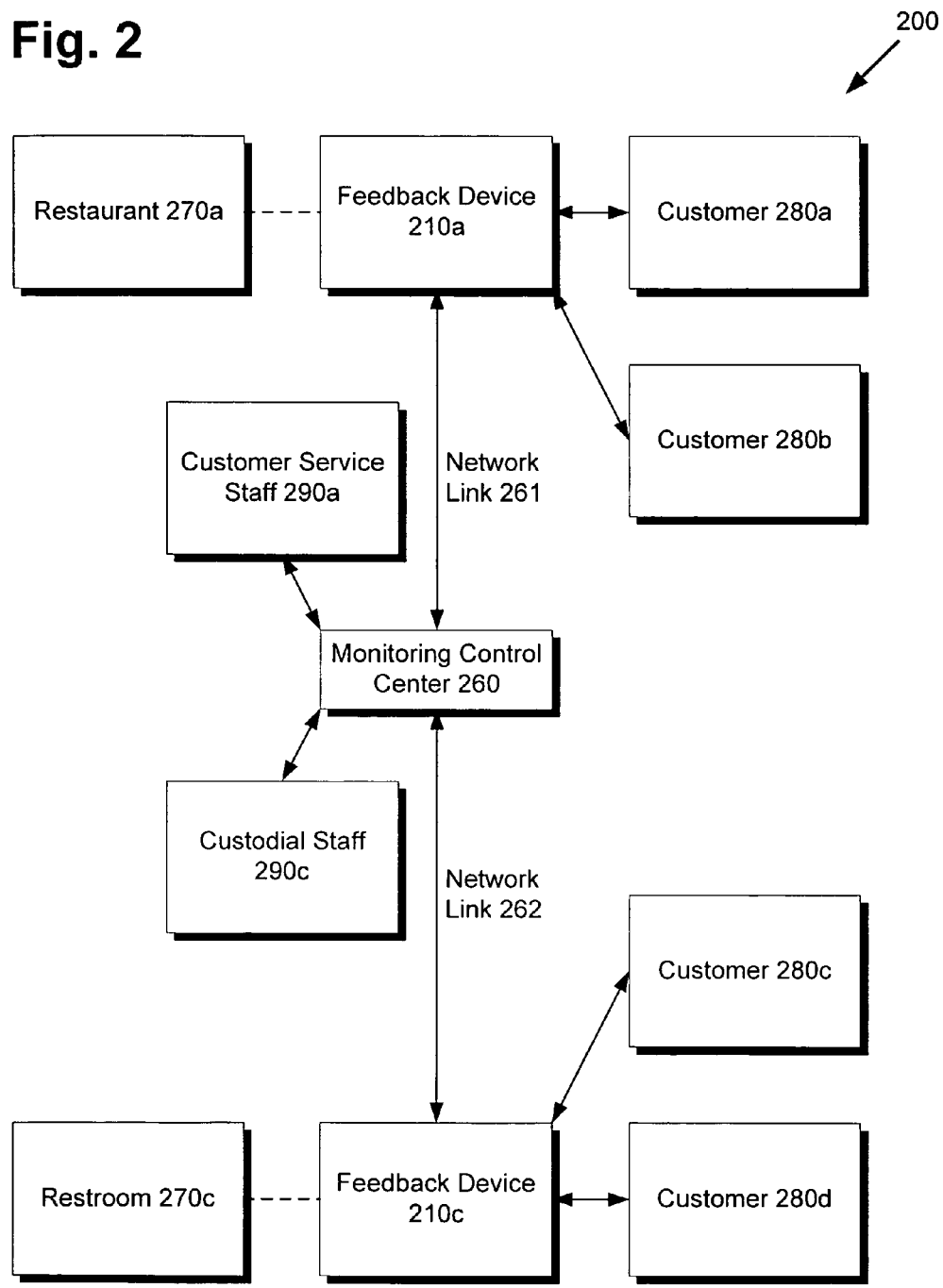
FIG. 2 presents a system for distributed collection of information from customers concerning points of interest, according to one embodiment of the present invention.

FIG. 2 presents a system for distributed collection of information from customers concerning points of interest, according to one embodiment of the present invention. Customer satisfaction feedback collection system 200 includes feedback devices 210a and 210b, monitoring control center 260, points of interest represented by restaurant 270a and restroom 270c, customers 280a, 280b, 280c, and 280d, and support personnel represented by customer service staff 290a and custodial staff 290c.

A number of parts from FIG. 2 have corresponding parts from FIG. 1. Feedback devices 210a and 210c correspond to feedback device 110 from FIG. 1. Monitoring control center 260 corresponds to monitoring control center 160 from FIG. 1. The network links in FIG. 2 including network links 261 and 262 are supported by a network, which corresponds to network 150 from FIG. 1.

Focusing on the first point of interest, restaurant 270a, feedback device 210a is configured to collect feedback regarding restaurant 270a, and thus incorporates a unique location identifier in a memory that identifies restaurant 270a. Customers 280a and 280b are thus enabled to provide their thoughts and feedback regarding their experience at restaurant 270a using feedback device 210a, such procedure already explained in some detail with FIG. 1 above. Once feedback is received, it can be transferred over network link 261 to monitoring control center 260 for further processing. If, for example, customer 280a provides a rating of "1" for poor quality of service, a member of customer service staff 290a might be dispatched to address the concerns of customer 280a, assuming the customer has previously agreed to allow support staff to meet in person.

Similarly, for the second point of interest, restroom 270c, feedback device 210c is configured to collect feedback regarding restroom 270c. Customers 280c and 280d can provide feedback regarding the cleanliness of restroom 270c, for example. This feedback can be transferred via network link 262 to monitoring control center 260. A threshold might be configured at monitoring control center 260 such that if average cleanliness ratings for a period of time drops below a certain level, custodial staff 290c is alerted to investigate the situation at restroom 270c.

Besides a restaurant and a restroom, feedback devices can be deployed to a wide variety of other locations and situations. One particularly suitable example is for monitoring customer enjoyment in a managed environment such as a theme park. Since customers normally need tickets to gain access to the theme park, a unique customer identifier could be placed on the ticket itself, or the ticket could be exchanged for an item such as an RFID wristband, the wristband serving the function of identifying a legitimate ticketed customer as well as uniquely identifying the customer for the feedback device.

Each park attraction might then have a feedback device located near the exit or endpoint of the attraction, prompting customers to rate the corresponding attraction experience. A rollercoaster, for example, might prompt users as to the excitement and thrill level experienced, and whether they plan on riding the same rollercoaster again. A stage show might accept a customer's show ticket as identification, and inquire into the performances of the stage show actors. Similarly, a movie theater might install a feedback device near the exit of the theater, accepting the moviegoer's ticket as identification and asking for impressions of the movie.

Thus, customer satisfaction can be collected and monitored at multiple distributed points of interest, allowing prompt and effective resolution of customer service issues while optimizing support staff utilization by directing personnel to trouble locations as needed. Additionally, customer preferences and trends can be tracked for research purposes, allowing businesses to focus on areas of growth by redirecting resources from marginal performers. This may be especially useful for businesses covering large areas such as theme parks or convention halls, where potentially hundreds of points of interest might require feedback. Similarly, nationwide business chains or restaurant franchises might leverage the distributed feedback collection to monitor and ensure that quality standards are maintained at individual locations. For more modestly sized businesses, the system might be scaled down to only one or a few feedback devices, adding additional feedback devices as the business grows.

Figure 3:
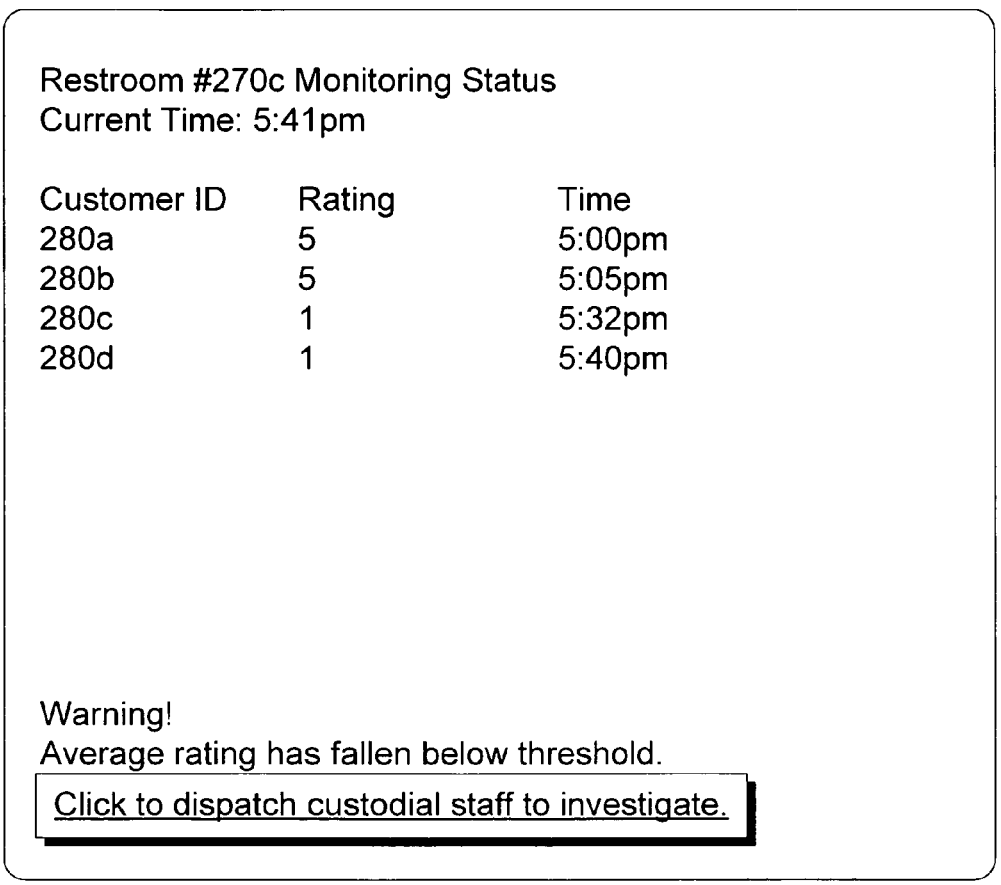
FIG. 3 presents a depiction of a monitoring control center display, in accordance with one embodiment of the present invention.

FIG. 3 presents a depiction of a monitoring control center display, in accordance with one embodiment of the present invention. Monitoring control center display 300 depicts a server display connected to a server, which may comprise one of many servers processing incoming feedback data from a network. These servers may correspond to monitoring control center 260 from FIG. 2. The particular server display depicted in FIG. 3 is assigned to receive data from feedback device 210c from FIG. 2, reporting on the cleanliness of restroom 270c.

As seen in FIG. 3, four data points from four different customers have already been received, processed and logged, summarized by the shown data table. Customer 280a and 280b may have utilized restroom 270 at an earlier time and since then moved on to restaurant 270a. When they visited restroom 270, it may have been sparkling clean, thus warranting the 5-star ratings. On the other hand, during the time period between 5:05 pm and 5:32 pm, some pranksters may have left a big mess in the restroom, prompting customers 280c and 280d to leave 1-star feedback for the horrible state of the restroom.

As previously mentioned, a threshold might be programmed into the logic of the monitoring control center to automatically issue alerts when collected feedback indicates an unsatisfactory state over a certain period of time. For example, the server used in FIG. 3 may be programmed to issue the warning message at the bottom of the screen if the average rating for restroom 270c dips below "3" over the last 10 minutes. Since within the last ten minutes, two 1-star ratings have been received, the server displays the warning message as shown in FIG. 3. An audible warning might also be sounded as well. At this point, operations staff working at the monitoring control center may click the button suggesting dispatch of custodial staff 290c to investigate restroom 270c. Alternatively, the dispatch of the custodial staff might happen automatically without a prompt requesting human confirmation.

The addition of a human confirmation step may help lower the incidences of false alarms, since human judgment may detect patterns that a computer may find difficult to detect by a rigid algorithm. For example, if several 1-star ratings are logged for the same customer nearly at the same time, operations staff might deduce that it looks suspiciously like prank feedback, thus choosing to ignore the resulting alert or at least waiting until other customers corroborate the true status of the restroom. On the other hand, some of this logic may be programmed into the monitoring control center itself. For example, a time interval may be defined for a particular point of interest, where it is unlikely that multiple feedback responses should be received in the normal course of events.

Should multiple feedback responses nevertheless be received, the monitoring control center might ignore or weight the feedback based on a number of variables, mitigating the unbalancing impact of the possibly duplicitous feedback. For example, feedback responses might be weighted by averaging feedback scores for every customer, based on some limiting time period such as an hour. In other words, the weight of each feedback is divided by the frequency of feedback provided by the customer over an hour. Thus, each customer is calibrated to have the same amount of influence over the system within a set time period. No matter how many times an individual customer provides feedback within an hour, the feedback will simply be averaged by that number of times, effectively resulting in a single averaged feedback score. This averaging method could be restricted to each individual point of interest, or could globally cover all monitored points of interest.

Although egalitarian, this averaging method may not compensate for differing confidence in the accuracy of each customer's feedback. Thus, the weighting system might be further configured to assign different weights to different customers, based on their past history and demonstrated reliability and loyalty. For example, a regular customer with a history of providing constructive feedback might be given ten times the feedback weight versus a new customer with no record. On the other hand, a customer repeatedly flagged for facetious feedback might be ignored completely.

FIG. 4 shows a flowchart describing the steps, according to one embodiment of the present invention, by which a feedback device can provide collection of information concerning a point of interest from a customer. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and customer satisfaction feedback collection system 200 of FIG. 2, step 410 of flowchart 400 comprises feedback device 210a receiving a unique customer identifier of customer 280a. Although step 410 may also be applied to customers 280b, 280c, and 280d, customer 280a is specifically chosen for the purposes of this example. To simplify the discussion, the unique customer identifier associated with customer 280a might simply comprise the value "280a." As previously discussed in conjunction with FIG. 1, the value "280a " can be stored and detected using a variety of means, such as barcode, magnetic stripe, or RFID, for example. Since customer 280a has patronized restaurant 270a, an implementation using a barcode printed on the customer's receipt might be used. Thus, ticket acceptor 140 from feedback device 110 of FIG. 1, which corresponds to feedback device 210a of FIG. 2, may accept, scan, and convert the barcode on the customer's receipt to a machine-readable value of "280a."

Referring to step 420 of flowchart 400 in FIG. 4 and customer satisfaction feedback collection system 200 of FIG. 2, step 420 of flowchart 400 comprises feedback device 210a storing the value "280a" received from step 410 into an embedded memory. This memory might be implemented using flash storage, dynamic random access memory (DRAM) chips, or some other method of storing data for future retrieval. In addition, this memory may be preconfigured to store the unique location identifier associated with the point of interest, which might be the value "270a" indicating restaurant 270a.

Referring to step 430 of flowchart 400 in FIG. 4 and customer satisfaction feedback collection system 200 of FIG. 2, step 430 of flowchart 400 comprises feedback device 210a receiving feedback concerning restaurant 270a from the customer. Since, in one embodiment, restaurant 270a is the point of interest, questions focusing on food quality and wait service may dominate the feedback session. Some generalized questions might be posed to all customers, such as opinions on restaurant ambience and cleanliness. More detailed questions might also be asked by collaborating with a point of sale (POS) database recording details about customer orders.

For example, feedback device 210a might customize the questions to the particular menu items the customer ordered and the assigned waiter serving the customer. If the customer ordered a steak "medium-rare," feedback device 210a might query the POS database, lookup the order associated with the customer to discover the details of the steak order, and thereby ask the customer how well done the steak was according to the customer's request of "medium-rare," and further ask the quality of the steak to be rated on a scale from 1 to 5 stars. After finishing menu related questions, feedback device 210a might turn the focus to the assigned waiter, Alfonzo, asking the customer to rate Alfonzo's attentiveness, courteousness, and promptness. Customer 280a might respond that the steak was indeed medium-rare as expected, earned 5-stars for quality, and that Alfonzo exceeded all expectations for service. Once feedback device 210a is finished conducting the feedback session, it might reward the customer with a discount voucher or some other incentive for their time.

Referring to step 440 of flowchart 400 in FIG. 4 and customer satisfaction feedback collection system 200 of FIG. 2, step 440 of flowchart 400 comprises feedback device 210a storing the information received from step 430 into the same embedded memory as step 420. Thus, in the restaurant example given above, step 440 would store the responses from step 430 regarding the restaurant, the menu, and Alfonzo.

Referring to step 450 of flowchart 400 in FIG. 4 and customer satisfaction feedback collection system 200 of FIG. 2, step 450 of flowchart 400 comprises feedback device 210a retrieving the information stored in steps 420 and 440 as well as the unique location identifier from the embedded memory. This step accesses data in preparation for the next step, where the data will be transferred.

Referring to step 460 of flowchart 400 in FIG. 4 and customer satisfaction feedback collection system 200 of FIG. 2, step 460 of flowchart 400 comprises feedback device 210a transferring the unique customer identifier "280a," the received feedback, and the unique location identifier "270a" to monitoring control center 260 over network link 261. Once the feedback data is received at monitoring control center 260, further functionality such as an alert and response system can be implemented as discussed above with FIG. 3.

Steps 410 to 460 can also be applied to customer 280b as well, collecting his thoughts on the rainbow trout dish he just had for dinner, as well as the level of service received from the assigned waiter, Bernard. In contrast to customer 280a, customer 280b might respond that the fish was dry and overcooked, giving it a 1-star rating. Additionally, customer 280b noted that Bernard's slow service and sullen behavior greatly diminished the enjoyment of dinner, earning Bernard 1 star ratings as well.

Using this feedback collected at monitoring control center 260, restaurant 270a might decide to send a customer service representative from customer service staff 290a to address the concerns of customer 280b, perhaps offering a sharp discount or a future voucher as an apology. Bernard might be placed under closer scrutiny to ensure the poor service episode remains an isolated incident. The menu might be rearranged to emphasize steak over seafood, or the chefs might go through additional seafood preparation training.

Alternatively, no corrective steps might be taken, so that additional feedback collected from other customers over a period of time can confirm that the problem is actually the food and the service rather than overly sensitive customers or employees having a bad day. Monitoring control center 260 might therefore retain feedback data over a certain period of time, running data mining and analysis over the retained data to discover trends, enabling restaurant 270a to adapt to changing circumstances. Monitoring control center 260 might alternatively or additionally provide the collected feedback data to an external device for more sophisticated analysis, such as a server executing customer relation management (CRM) software.

The feedback data or the resulting data analysis might further be accessible through an internal network for employees, so that employees can address customer concerns or provide informed recommendations with the collected information. For example, waiters can recommend highly rated menu items with confidence, or recommend a complementary wine based on previous feedback indicating a particular dish pairs well with a particular wine. A customer particularly sensitive to dirty environments might request the location of the cleanest restroom available, which might be deduced by sorting restrooms on average cleanliness ratings. In this manner, employees are enabled to provide more informed responses and recommendations with feedback collected from fellow customers.

Steps 410 to 460 can also be applied to customers 280c and 280d, collecting their thoughts about the cleanliness of restroom 270c through feedback device 210c. Monitoring control center 260 might be configured to dispatch custodial staff 290c automatically to restroom 270c upon the receipt of several low cleanliness ratings or some other trigger, as detailed above with FIG. 3. Limited custodial staff might thus be utilized in a more efficient manner, rather than the common but labor-intensive practice of constantly sending custodial staff on short intervals to detect any problems. The savings in labor costs may be especially significant if there are multiple locations requiring custodial oversight, such as restrooms located on each floor of a multi-story building.

As part of the advantages of various embodiments of the present invention, customers can express their impressions and concerns to businesses more easily, giving them peace of mind that their voice is being heard without wasted time and effort. Businesses thus benefit from rapid and real-time feedback from a broad range of customers, allowing efficient turnaround for resolving customer service issues and maintaining customer loyalty, ultimately resulting in a more positive experience for customers.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device for collecting one of a plurality of pre-determined answers from a customer in response to a question concerning a point of interest, the device comprising:
    a memory configured to store a unique location identifier associated with the point of interest;
    a plurality of RFID readers, each of the plurality of RFID readers corresponding to each of the plurality of pre-determined answers;
    a processor configured to:
        receive a unique customer identifier from the customer;
        store the unique customer identifier in the memory;
        receive the one of the plurality of pre-determined answers in response to the question concerning the point of interest from the customer using the corresponding one of the plurality of RFID readers; and
        store the one of the plurality of pre-determined answers in the memory.

2. The device of claim I, wherein the processor is further configured to:
    retrieve the unique customer identifier, the one of the plurality of pre-determined answers, and the unique location identifier from the memory; and
    transmit the unique customer identifier, the one of the plurality of pre-determined answers concerning the point of interest, and the unique location identifier to a center via a network.

3. The device of claim 1, wherein the one of the plurality of RFID readers corresponding to the one of the plurality of pre-determined answers receives the one of the plurality of pre-determined answers from an RFID tag embedded in a ticket.

4. The device of claim 1, wherein the one of the plurality of RFID readers corresponding to the one of the plurality of pre-determined answers receives the one of the plurality of pre-determined answers from an RFID tag embedded in a wristband.

5. The device of claim 1, wherein the one of the plurality of RFID readers corresponding to the one of the plurality of pre-determined answers receives the one of the plurality of pre-determined answers from an RFID tag embedded in a card.

6. The device of claim 1, wherein the device is located in a stationary kiosk placed at the point of interest.

7. The device of claim 1, wherein the processor is further configured to reward the customer with an incentive in response to providing an RFID tag of the customer to be read by the one of the plurality of RFID readers corresponding to the one of the plurality of pre-determined answers.

8. A system for collecting one of a plurality of pre-determined answers from a customer in response to a question concerning a point of interest, the system comprising:
    a center to aggregate the information;

a device having:
> a memory including a unique location identifier associated with the point of interest;
> a plurality of RFID readers, each of the plurality of RFID readers corresponding to each of the plurality of pre-determined answers;
> a processor configured to:
>> receive a unique customer identifier from a customer;
>> store the unique customer identifier in the memory;
>> receive the one of the plurality of pre-determined answers in response to the question concerning the point of interest from the customer using the corresponding one of the plurality of RFID readers;
>> store the one of the plurality of pre-determined answers in the memory;
>> retrieve the unique customer identifier, the one of the plurality of pre-determined answers, and the unique location identifier from the memory; and
>> transmit the unique customer identifier, the one of the plurality of pre-determined answers concerning the point of interest, and the unique location identifier to the center via a network.

9. The system of claim 8, wherein the center is configured to receive the unique customer identifier, the one of the plurality of pre-determined answers concerning the point of interest, and the unique location identifier to the center via the network and analyze the plurality of answers gathered over a period of time.

10. The system of claim 9, wherein the center is configured to assign a weight to the one of the plurality of answers using variables associated with the unique customer identifier providing the one of the plurality of answers.

11. The system of claim 10, wherein the variables include the frequency of the plurality of answers provided over a defined time interval.

12. The system of claim 9, wherein the center is configured to trigger an alert based on the plurality of answers.

13. The system of claim 12, wherein the alert results in the dispatching of service personnel to the point of interest.

14. The system of claim 12, wherein the alert results in the dispatching of service personnel to the customer associated with the unique customer identifier.

15. A method for collecting one of a plurality of pre-determined answers from a customer in response to a question concerning a point of interest, the device having a processor and a memory including a unique location identifier associated with the point of interest, and the device further having a plurality of RFID readers, each of the plurality of RFID readers corresponding to each of the plurality of pre-determined answers, the method comprising:
> receiving a unique customer identifier from the customer;
> storing the unique customer identifier in the memory;
> receiving the one of the plurality of pre-determined answers in response to the question concerning the point of interest from the customer using the corresponding one of the plurality of RFID readers; and
> storing the one of the plurality of pre-determined answers in the memory.

16. The method of claim 15, the method further comprising:
> retrieving the unique customer identifier, the one of the plurality of pre-determined answers, and the unique location identifier from the memory; and
> transmitting the unique customer identifier, the one of the plurality of pre-determined answers concerning the point of interest, and the unique location identifier to a center via a network.

17. The method of claim 15, wherein the one of the plurality of RFID readers corresponding to the one of the plurality of pre-determined answers receives the one of the plurality of pre-determined answers from an RFID tag embedded in a ticket.

18. The method of claim 15, wherein the one of the plurality of RFID readers corresponding to the one of the plurality of pre-determined answers receives the one of the plurality of pre-determined answers from an RFID tag embedded in a wristband.

19. The method of claim 15, wherein the one of the plurality of RFID readers corresponding to the one of the plurality of pre-determined answers receives the one of the plurality of pre-determined answers from an RFID tag embedded in a card.

20. The method of claim 15 further comprising rewarding the customer with an incentive in response to providing an RFID tag of the customer to be read by the one of the plurality of RFID readers corresponding to the one of the plurality of pre-determined answers.

* * * * *